United States Patent
Carey (10) Patent No.: US 11,317,275 B2
(45) Date of Patent: Apr. 26, 2022

(54) 5G AND SATELLITE PARALLEL SERVICE

(71) Applicant: DISH Wireless L.L.C., Englewood, CO (US)

(72) Inventor: Ryan Richard Carey, Denver, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 0 days.

(21) Appl. No.: 16/940,121

(22) Filed: Jul. 27, 2020

(65) Prior Publication Data

US 2022/0030415 A1 Jan. 27, 2022

(51) Int. Cl.
*H04W 8/14* (2009.01)
*H04W 84/22* (2009.01)
*H04L 69/16* (2022.01)
*H04W 48/18* (2009.01)
*H04L 47/28* (2022.01)

(52) U.S. Cl.
CPC .............. *H04W 8/14* (2013.01); *H04L 47/28* (2013.01); *H04L 69/16* (2013.01); *H04W 48/18* (2013.01); *H04W 84/22* (2013.01)

(58) Field of Classification Search
CPC ....... H04W 8/14; H04W 48/18; H04W 84/18; H04W 84/20; H04W 84/22; H04L 47/10; H04L 47/12; H04L 47/122; H04L 47/125; H04L 47/28; H04L 47/283; H04L 69/16
See application file for complete search history.

(56) References Cited

U.S. PATENT DOCUMENTS

| | | | | |
|---|---|---|---|---|
| 3,705,523 A * | 12/1972 | Alouisa | ............... | H04Q 3/545 379/221.01 |
| 6,968,394 B1 * | 11/2005 | El-Rafie | ............... | H04L 69/16 455/3.01 |
| 7,307,956 B2 * | 12/2007 | Kaplan | ............... | H04L 12/5692 370/238 |
| 7,430,164 B2 * | 9/2008 | Bare | ............... | H04L 29/12009 370/217 |
| 7,564,805 B1 * | 7/2009 | Cortez | ............... | H04L 41/0896 370/255 |
| 9,749,792 B2 * | 8/2017 | Klicpera | ............... | G06Q 50/06 |

(Continued)

*Primary Examiner* — Kevin D Mew
(74) *Attorney, Agent, or Firm* — Seed IP Law Group LLP (57) ABSTRACT

Embodiments are directed towards employing parallel satellite and wire transmissions to facilitate 5G communications. A network origination system receives, via 5G communication, a message from an origination device for distribution to a destination device. The network origination system determines a priority of the message and selects a transmission mechanism—wire transmission, satellite transmission, or parallel transmission—in which to transmit the message to the network destination system based on the priority. The network origination system transmits the message to a network destination system via the selected transmission mechanism. The network destination system forwards the message to the destination device and determines if the message is tagged for the parallel transmission. If the message is tagged for parallel transmission, the network destination system determines if the message is received via wire transmission and satellite transmission within a time window associated with a transmission time obtained from the message.

18 Claims, 6 Drawing Sheets

(56) References Cited

U.S. PATENT DOCUMENTS

| | | | |
|---|---|---|---|
| 2005/0265370 A1* | 12/2005 | Fuente | H04L 69/16 |
| | | | 370/412 |
| 2006/0073838 A1* | 4/2006 | Kamali | A61B 5/411 |
| | | | 455/456.1 |
| 2017/0237784 A1* | 8/2017 | Maistri | H04L 65/1083 |
| | | | 348/14.02 |
| 2018/0014212 A1* | 1/2018 | Oga | H04W 24/02 |
| 2019/0132657 A1* | 5/2019 | Struhsaker | H04W 4/70 |
| 2020/0119807 A1* | 4/2020 | Whitefield | H04B 7/18517 |
| 2020/0204484 A1* | 6/2020 | Altman | H04L 45/306 |
| 2020/0245162 A1* | 7/2020 | Dion | H04W 40/14 |
| 2020/0245210 A1* | 7/2020 | Fotheringham | H04W 12/08 |

\* cited by examiner

5G AND SATELLITE PARALLEL SERVICE

TECHNICAL FIELD

The present disclosure relates generally to digital message communications and, more particularly, to parallel transmission of cellular signals via 5G and satellite transmission protocols.

BACKGROUND

Description of the Related Art

Smart phones are being used more and more by more and more people. As the use of smart phones has increased, so too has the desire for faster networks with increased bandwidth. Implementation of 5G technology looks to address both of these desires. A 5G network, however, consists of cell towers, base stations, and other computing devices that transmit messages via wired connections towards a destination device. To provide faster network speeds and increased bandwidth to users, the reliability of the devices and wire connections between devices in the network is paramount. Failure of one or more devices or connections within the network can cause coverage outages or slower speeds until the failure is remedied. It is with respect to these and other considerations that the embodiments described herein have been made.

BRIEF SUMMARY

Briefly described, embodiments are directed toward systems and methods of employing parallel satellite and wire transmissions to facilitate 5G communications. A network origination system receives a 5G message from a message origination device and determines its priority. The network origination system then transmits the message to a network destination system via wire transmission, satellite transmission, or parallel transmission depending on the message priority. The network destination system forwards the message to a message destination device. The network destination system also determines if parallel transmission of the message was successful within a select time window. If not, the network destination system provides a re-route request to the network origination system to modify the routing preferences of the network origination system. Use of parallel transmissions enable more efficient prioritization of messages and near real-time network failure detection.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
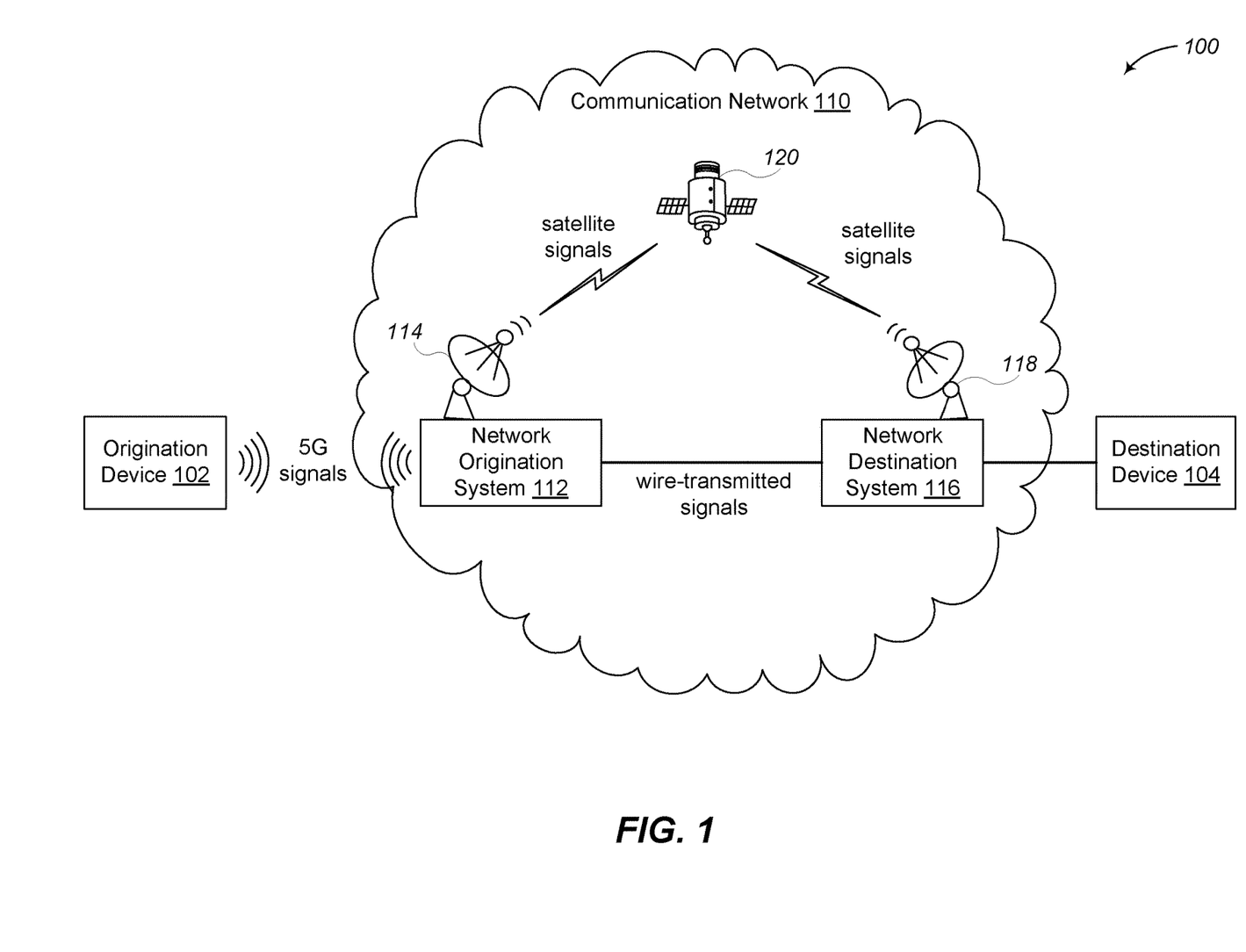
FIG. 1 illustrates a context diagram of an environment for providing parallel 5G and satellite message transmission in accordance with embodiments described herein.

FIG. 1 illustrates a context diagram of an environment 100 for providing parallel 5G and satellite message transmission in accordance with embodiments described herein. Environment 100 includes an origination device 102, a destination device 104, and a communication network 110. In various embodiments, the communication network 110 may be a 5G network or other wireless network.

The origination device 102 is a computing device that communicates with the communication network 110 via 5G signals and protocols (or other signals and protocols compatible with the communication network 110). In some embodiments, the origination device 102 may be referred to as a message origination device.

The origination device 102 is the computing device that transmits a message to a network origination system 112 in the communication network 110. In some embodiments, the origination device 102 is the device that generates the message for transmission to the destination device 104. In other embodiments, the origination device 102 is forwarding the message from another device to the network origination system 112 to be transmitted to the destination device 104. In some embodiments, origination device 102 is a smart phone, tablet computer, laptop computer, router, switch, or other computing device that communicates with the communication network 110 via wireless signals.

The destination device 104 is the device that receives a message from a network destination system 116 in the communication network 110. In some embodiments, the destination device 104 is the device that is the end device that is to receive or process the message. In other embodiments, the destination device 104 forwards the message to another device outside of the communication network 110. In some embodiments, destination device 104 is a smart phone, tablet computer, laptop computer, router, switch, server, or other computing device that communicates with the communication network 110. The destination device 104 may communicate with the communication network 110 via wired or wireless communication signals.

The communication network 110 includes a network origination system 112 and a network destination system 116. The network origination system 112 may include various antennas, base stations, or other devices associated with the reception of 5G messages from the origination device 102 and the transmission of such messages to the network destination system 116. The network origination system 112 may include computing devices and components to facilitate the transmission of messages between the network origination system 112 and the network destination system 116 via wire-transmitted signals. The network origination system 112 also includes a satellite antenna 114 to send and receive satellite signals to and from satellite 120. Although only a single network origination system 112 is illustrated, the communication network 110 may include a plurality of network origination systems.

The network destination system 116 may include various antennas, base stations, or other computing devices associated with the transmission of wired or wireless messages to the destination device 104. The network destination system 116 may include computing devices and components to facilitate the transmission of messages between the network origination system 112 and the network destination system 116 via wire-transmitted signals. The network destination system 116 also includes a satellite antenna 118 to send and receive satellite signals to and from satellite 120. Although only a single network destination system 116 is illustrated, the communication network 110 may include a plurality of network destination systems.

As described in more detail below, the network origination system 112 receives a message from a origination device 102 via 5G wireless communication signals. The network origination system 112 selects a network destination system 116 that can forward the message to the destination device 104. The network origination system 112 determines a priority of the message and selects a transmission mechanism in which to transmit the message to the network destination system 116 based on the priority. Such transmission mechanisms may be wire transmission, satellite transmission, or parallel with wire and satellite transmission. The network origination system 112 then transmits the message to the network destination system 116 via the selected transmission mechanism.

The network destination system 116 forwards the message to the destination device 104. The network destination system 116 also determines whether the message was transmitted via parallel transmission. If it was, then the network destination system 116 determines if it receives the message via both transmission mechanisms within a time window. If not, the network destination system 116 can transmit a re-route request to the network origination system 116. The network origination system 116 can utilize the re-route request to modify the transmission mechanisms associated with various messages, origination devices, priorities, etc.

In some embodiments, the network destination system 116 can also identify various quality of service parameters based on a comparison of one or more parameters associated with the message being received via satellite transmission and one or more parameters associated with the message being received via wire transmission. For example, if the message is received satellite transmission outside of a transmission time window, then the quality of service of the satellite transmission may be degraded for one or more reasons. A network administrator can use this information to debug or identify errors or failures in the satellite transmission mechanism. Similar quality of service information can also be identified for the wire transmission mechanism.

Figure 2:
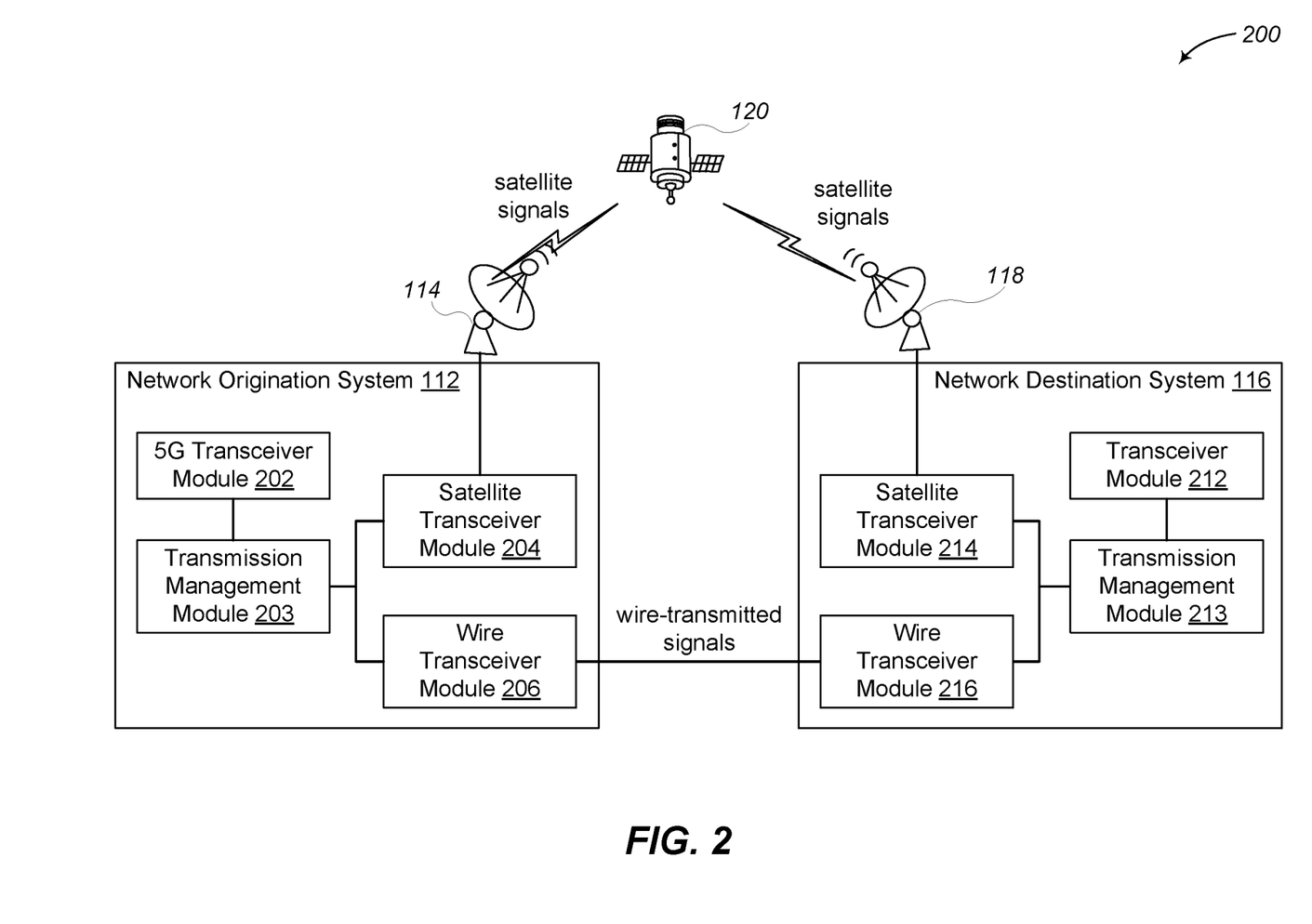
FIG. 2 is a context diagram of a non-limiting embodiment of systems in a communication network for providing parallel 5G and satellite message transmission in accordance with embodiments described herein.

FIG. 2 is a context diagram of a non-limiting embodiment of systems in a communication network 200 for providing parallel 5G and satellite message transmission in accordance with embodiments described herein. In various embodiments, the communication network 200 may be an embodiment of the communication network 110 in FIG. 1. For example, communication network 200 may include a network origination system 112 and a network destination system 116.

The network origination system 112 includes a 5G transceiver module 202, a transmission management module 203, a satellite transceiver 204, and a wire transceiver module 206. The 5G transceiver module 202 is configured to facilitate communications with a message origination device (not illustrated) via 5G wireless communication. The 5G transceiver module 202 is in communication with the transmission management module 203.

The transmission management module 203 selects the network destination system 116 and determines a priority of the received message. The transmission management module 203 selects whether the message is to be transmitted via wire transmission, satellite transmission, or in parallel. Depending on the selected transmission mechanism, the transmission management module 203 communications with the satellite transceiver module 204, the wire transceiver module 206, or both to facilitate transmission of the message to the network destination system 116.

The satellite transceiver module 204 is configured to send and receive information to and from the satellite 120 via satellite signals using antenna 114. The wire transceiver module 206 is configured to send and receive information to and from the network destination system 116 via wire-transmitted signals.

Although the network origination system 112 is illustrated as having four modules, embodiments are not so limited; rather, network origination system 112 may have more or fewer modules or components to perform the functions described herein.

The network destination system 116 includes a transceiver module 212, a transmission management module 213, a satellite transceiver 214, and a wire transceiver module 216. The satellite transceiver module 214 is configured to send and receive information to and from the satellite 120 via satellite signals using antenna 118. The wire transceiver module 216 is configured to send and receive information to and from the network origination system 112 via wire-transmitted signals.

The transmission management module 213 receives messages via the satellite transceiver module 214 or the wire transceiver module 126. The transmission management module 213 is in communication with the transceiver module 212, which is configured to facilitate communications with a message destination device (not illustrated) via wire or wireless communication. The transmission management module 213 can return re-route requests to the network origination system 112 via the satellite transceiver module 214 or the wire transceiver module 216, as described herein.

Although the network destination system 116 is illustrated as having four modules, embodiments are not so limited; rather, network destination system 116 may have more or fewer modules or components to perform the functions described herein.

The operation of certain aspects will now be described with respect to FIGS. 3-5. In at least one of various embodiments, processes 300 and 400 described in conjunction with FIGS. 3 and 4 may be implemented by or executed via circuitry or on one or more computing devices, such as network origination system 112 in FIG. 1; and process 500 described in conjunction with FIG. 5 may be implemented by or executed via circuitry or on one or more other computing devices, such as network destination system 116 in FIG. 1.

Figure 3:
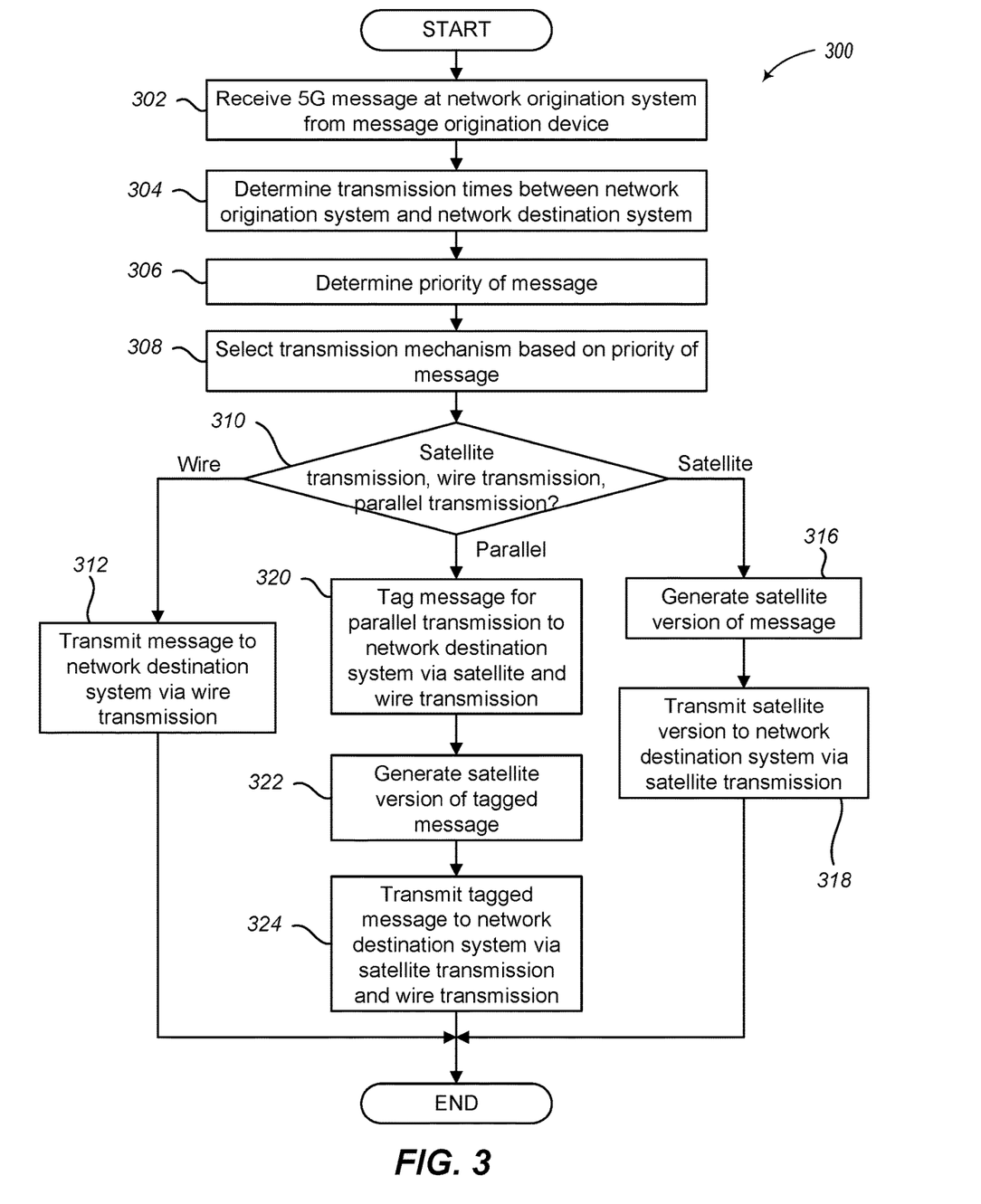
FIG. 3 illustrates a logical flow diagram showing one embodiment of a process for a network origination system to employ parallel 5G and satellite message transmission in accordance with embodiments described herein.

FIG. 3 illustrates a logical flow diagram showing one embodiment of a process 300 for a network origination system to employ parallel 5G and satellite message transmission in accordance with embodiments described herein.

Process 300 begins on FIG. 3A, after a start block, at block 302, where a 5G message is received at the network origination system from a message origination device, such as origination device 102 in FIG. 1. The message may be a single packet or a plurality of packets. Therefore, embodiments described below may be for a single message packet or for a plurality of packets associated with a message.

As mentioned above, the message origination device may be the cellular phone sending the message or some other intermediate wireless transmission device, and the network origination system may be a cellular base station that first receives the message from the message origination device or some other communication device within the wireless network.

Process 300 proceeds to block 304, where transmission times between the network origination system and a network destination system are determined. As mentioned above, the network destination system is selected from a plurality of network destination systems within the wireless network and is selected to transmit the message to the message destination device.

In various embodiments, two transmission times are determined: 1) a first transmission time between the network origination system and the network destination system via wired transmission and 2) a second transmission time between the network origination system and the network destination system via a satellite transmission. In various embodiments, a routing table or other data structure may store known transmission times between the network origination system and the plurality of message origination devices in the network. The routing table can be accessed and queried for the transmission times once the network destination system is selected or it is used to both select the network destination system and determine the transmission times.'

Process 300 continues at block 306, where a priority of the message is determined. In various embodiments, the priority may be determined as low or high, or as some other numerical priority system.

In some embodiments, the priority of the message may be selected or determined based on an account policy or type of priority account held by the message origination device. For example, if a corporation that pays a higher amount for 5G message service compared to a personal account, then messages from the message origination devices associated with the corporation may have a higher priority than message from message origination devices associated with personal accounts.

In other embodiments, the priority of the message may be selected or determined based on the message destination device. For example, if the message destination device is associated with 911 or other emergency services, then the message may be designated as high priority. Conversely, if the message destination device is a server for an online retail company, then the message may be designated as low priority.

In yet other embodiments, the priority of the message may be selected or determined based on the content of the message. For example, if the message includes a personal message, then the message may be designated as medium or high priority. Conversely, if the message includes an advertisement, then the message may be designated as low priority.

Process 300 proceeds next to block 308, where a transmission mechanism or route is selected based on priority of the message. In various embodiments, the transmission mechanism is selected from among, satellite transmission, wire transmission, or parallel transmission through both satellite and wire transmissions.

A manager, developer, or other administrator associated with the network may pre-select which transmission mechanism to use for different message priorities. For example, high priority messages may be transmitted in parallel through both satellite and wire transmissions, low priority messages may be transmitted via satellite transmission, and medium or non-prioritized messages may be transmitted via wire transmission.

In some embodiments, a routing table or database may store the routing information for the different priority levels. In various embodiments, routing information may be further delineated for different message origination devices or message destination devices. For example, a first company may pay to have high priority messages to be transmitted via parallel transmission, whereas a second company may pay to have all messages, independent of their priority, transmitted via parallel transmission.

Process 300 continues next at decision block 310, where a termination is made whether the message transmission is to be via satellite transmission, wire transmission, or in parallel.

If the message is to be routed from the network origination system to the network destination system via wire transmission, then process 300 flows from decision block 310 to block 312. At block 312, the message is transmitted to the network destination system via wire transmission. In various embodiments, the message is encapsulated for wire transmission via a plurality of wired (or wireless) network connections between the network origination system and the network destination system. In various embodiments, the message may be modified to include the wire transmission timed determined at block 304. Likewise, in some embodiments, the message may be modified to include the message priority determined at block 306. After block 312, process 300 may terminate or otherwise return to a calling process to perform other actions.

If the message is to be routed from the network origination system to the network destination system via satellite transmission, then process 300 flows from decision block 310 to block 316. At block 316, a satellite version of the message is generated. In various embodiments, the message may be modified to include the satellite transmission timed determined at block 304. Likewise, in some embodiments, the message may be modified to include the message priority determined at block 306.

Process 300 proceeds to block 318, where the satellite version is transmitted to the destination system via satellite transmission. In various embodiments, this satellite transmission includes an uplink from the network origination system to a satellite and a downlink from the satellite to the network destination system (noting that various antennas, dishes, and other communication systems may be used in the transmission. After block 318, process 300 may terminate or otherwise return to a calling process to perform other actions.

If the message is to be transmitted via parallel transmission, then process 300 flows from decision block 310 to block 320. At block 320, the message is tagged for parallel transmission. This tag may be a flag or other indicator in the message or in a header of the message indicating that the message is being transmitted from the network origination system to the network destination system via satellite transmission and wire transmission.

Process 300 proceeds next to block 322, where a satellite version of the tagged message is generated. In various embodiments, block 322 may employ embodiments of block 316 to generate the tagged satellite message.

Process 300 continues next at block 324, where the tagged message is transmitted from the network origination system to the network destination system via satellite transmission and separately via wire transmission. In various embodiments, block 324 may employ embodiments of block 318 to transmit the tagged message via satellite transmission and block 312 to transmit the tagged message via wire transmission. After block 324, process 300 may terminate or otherwise return to a calling process to perform other actions.

Figure 4:
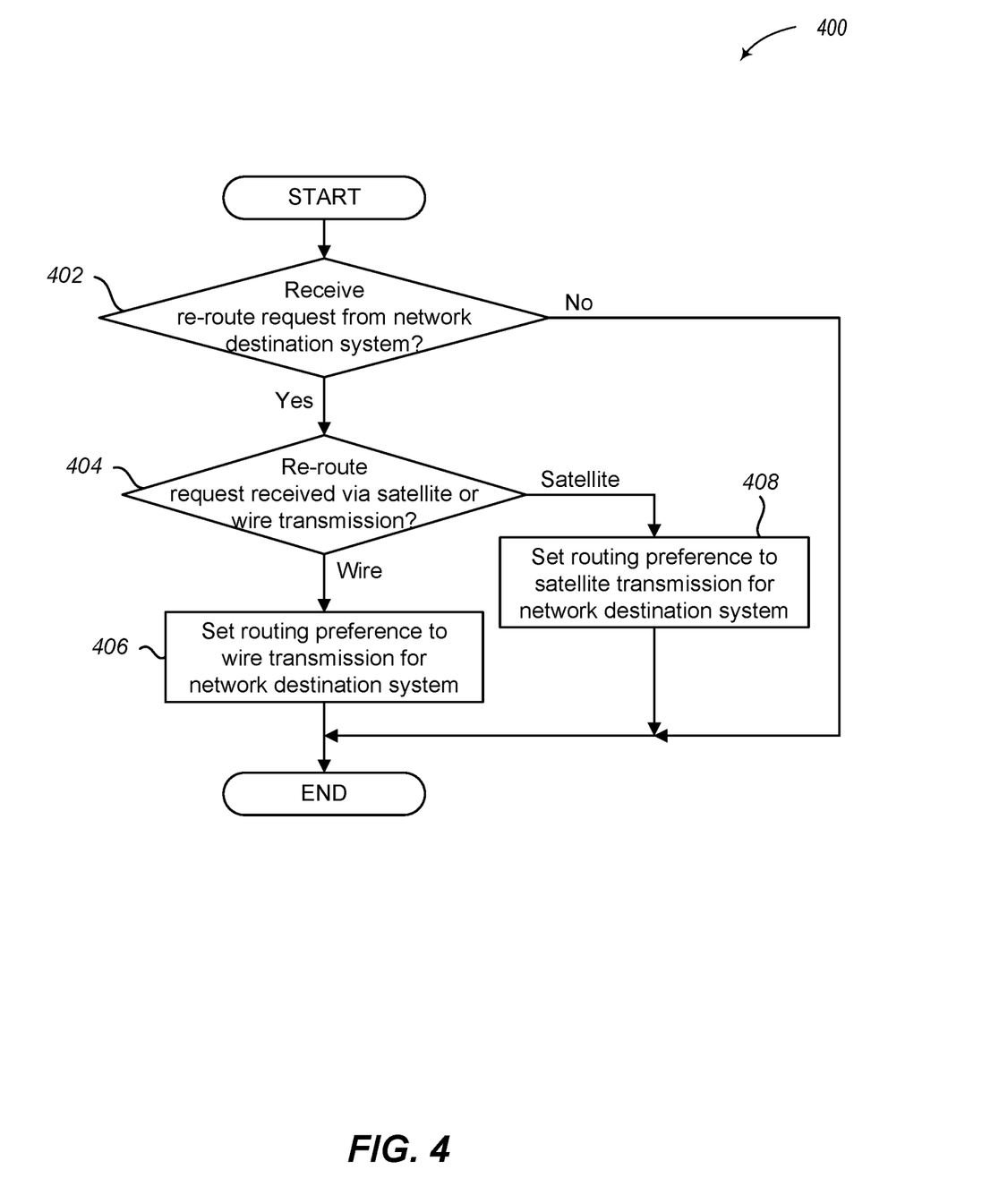
FIG. 4 illustrates a logical flow diagram showing one embodiment of a process for a network origination system to update routing preferences using parallel 5G and satellite message transmission in accordance with embodiments described herein.

FIG. 4 illustrates a logical flow diagram showing one embodiment of a process 400 for a network origination system to update routing priority using parallel 5G and satellite message transmission in accordance with embodiments described herein.

Process 400 begins, after a start block, at decision block 402, where a determination is made whether the network origination system received a re-route request from the network destination system. As described in FIG. 3, the network origination system transmits a message via wire transmission, satellite transmission, or in parallel via both wire and satellite transmission. Moreover, as described in more detail in conjunction with FIG. 5, the network destination system may transmit a re-route request back to the network origination system.

In some embodiments, the re-route request may indicate that the message, or a portion of the message, transmitted from the network origination system to the network destination system via wire transmission was not received by the network destination system. In other embodiments, the re-route request may indicate that the message, or a portion of the message, transmitted from the network origination system to the network destination system via satellite transmission was not received by the network destination system. This type of dynamic feedback can provide near real-time indications of transmission errors.

For example, if the message was tagged for parallel transmission and the message was only received by the network destination system via satellite transmission, then the message transmitted to the network destination system via wire transmission was not received. The network destination system may provide a re-route request to the network origination system indicating that future messages or portions of the message should be transmitted via satellite transmission or priority given for satellite transmission. In this example, the re-route request may provide dynamic feedback indicating that a portion of the wire connection between the network origination system and the network destination system has been disrupted.

As another example, if the message was only sent via satellite transmission and the message was received by the network destination system outside of a threshold time period or window after the transmission time of the message (e.g., as determined at block 304), then the message transmitted to the network destination system via satellite transmission was delayed. The network destination system may provide a re-route request to the network origination system indicating that future messages or portions of the message should be transmitted via wired transmission or priority given for wired transmission. In this example, the re-route request may provide dynamic feedback indicating that the satellite is experienced transmission errors or unusually high bandwidth, which is causing delayed transmissions.

If the network origination system received a re-route request from the network destination system, then process 400 flows from decision block 402 to decision block 404; otherwise process 400 may terminate or return to a calling process to perform other actions.

At decision block 404, a determination is made whether the re-route request was received via satellite transmission or wire transmission. If the re-route request was received via wire transmission, then process 400 flows from decision block 404 to block 406. At block 406, the network origination system sets the routing preference for the network destination system to be via wire transmission. In some embodiments, the preference is updated for the particular message. In other embodiments, the preference is updated for all messages from the network origination system to the network destination system. In yet other embodiments, the routing preference is updated for messages having a threshold priority. For example, high priority messages are set to be sent via wire transmission. After block 406, process 400 terminates or otherwise returns to a calling process to perform other actions.

If the re-route request was received via satellite transmission, then process 400 flows from decision block 404 to block 408. At block 408, the network origination system sets the routing preference for the network destination system to be via satellite transmission. Similar to block 406, the preference is updated for the particular message, all messages from the network origination system to the network destination system, or for messages having a threshold priority. After block 408, process 400 terminates or otherwise returns to a calling process to perform other actions.

By updating the routing preferences based on the re-route request received from the network destination system, the network origination system can more efficiently manage and prioritize messages and traffic sent to the network destination system.

Figure 5:
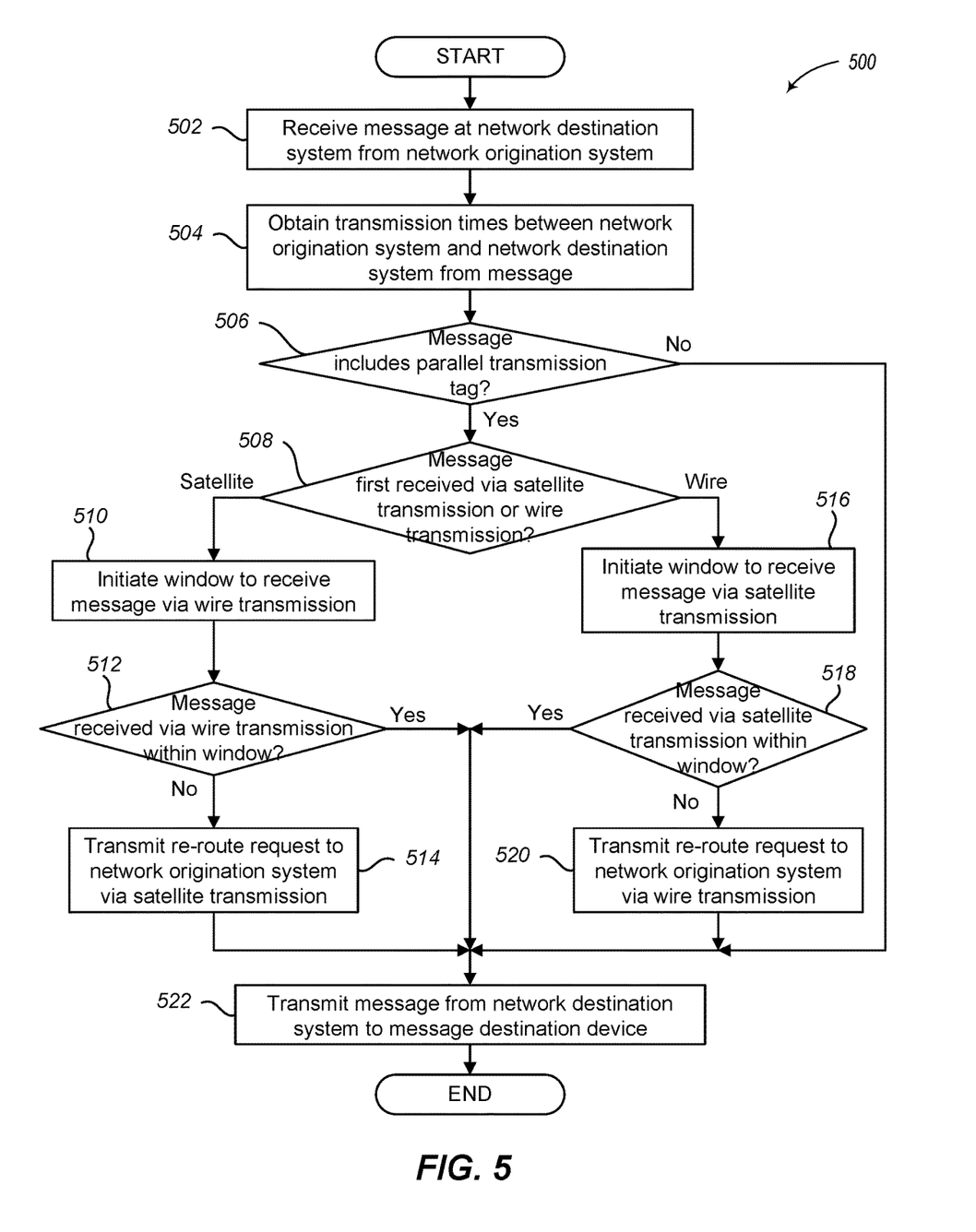
FIG. 5 illustrates a logical flow diagram showing one embodiment of a process for a network destination system to employ parallel 5G and satellite message transmission in accordance with embodiments described herein.

FIG. 5 illustrates a logical flow diagram showing one embodiment of a process 500 for a network destination system to employ parallel 5G and satellite message transmission in accordance with embodiments described herein.

Process 500 begins, after a start block, at block 502, where the network destination system receives a message from a network origination system. As mentioned above, the message may be transmitted from the network origination system to the network destination system as a single packet or as a series of packets and may be sent via wire transmission, satellite transmission, or parallel transmission of both wire and satellite transmission.

Process 500 proceeds to block 504, where the transmission times between the network origination system and the network destination system are obtained from the message. The message may include a single transmission time (e.g., a satellite transmission time or a wire transmission time) or multiple transmission times (e.g., a satellite transmission time and a wire transmission time when the message is sent it parallel).

Process 500 proceeds to decision block 506, where a determination is made whether the received message includes a parallel transmission tag. If the message includes a parallel transmission tag, then process 500 flows to decision block 508; otherwise process 500 flows to block 522.

At decision block 508, a determination is made whether the message was first received via satellite transmission or wire transmission. If the message is first received via satellite transmission, then process 500 flows to block 510. If the message is first received via wire transmission, then process 500 flows to block 516.

At block 510, a window in which to receive the message via wire transmission is initiated based on the transmission time obtained at block 504 for the message to be transmitted via wire transmission. In some embodiments, the transmission time may include an estimated time of arrival and the window may a selected time period after expiration of the estimated time of arrival. In other embodiments, the transmission time may be an estimated amount of time in which transmission should take between the network origination system and the network destination system and the window may be a selected time period longer than the estimated amount of time (e.g., a given amount of time or a percentage of time based on the estimated amount of time).

Process 500 proceeds to decision block 512, where a determination is made whether the message is subsequently received via wire transmission within the time window. If the message is received via wire transmission after or outside of the window, or if it is not received at all, then process 500 flows to block 514; otherwise, process 500 flows to block 522.

At block 514, the network destination system transmits a re-route request to the network origination system via satellite transmission. In some embodiments, the re-route request may be a simple message requesting the network origination system to route future messages to the network destination system via satellite transmission. In other embodiments, the re-route request may indicate whether the wire-transmitted message was delayed or never received. After block 514, process 500 flows to block 522.

If, at decision block 508, the message was first received via wire transmission, then process 500 flows from decision block 508 to block 516. At block 516, a window in which to receive the message via satellite transmission is initiated based on the transmission time obtained at block 504 for the message to be transmitted via satellite transmission. Similar to block 510, the window may be a selected time period after expiration of an estimated time of arrival, or it may be a selected time period longer than an estimated amount of time (e.g., a given amount of time or a percentage of time based on the estimated amount of time).

Process 500 proceeds to decision block 518, where a determination is made whether the message is subsequently received via satellite transmission within the time window. If the message is received via satellite transmission after or outside of the window, or if it is not received at all, then process 500 flows to block 520; otherwise, process 500 flows to block 522.

At block 520, the network destination system transmits a re-route request to the network origination system via wire transmission. In some embodiments, the re-route request may be a simple message requesting the network origination system to route future messages to the network destination system via wire transmission. In other embodiments, the re-route request may indicate whether the satellite-transmitted message was delayed or never received. After block 520, process 500 flows to block 522.

At block 522, the message is transmitted from the network destination system to the message destination device via a wired or wireless connection. After block 522, process 500 terminates or otherwise returns to a calling process to perform other actions.

Although the above processes are described as being performed by separate network origination systems and network destination systems, embodiments are not so limited. In some embodiments, a network system may operate as a network origination system, a network destination system, or both depending whether it is closest to the message origination device or the message destination device and whether it is processing unidirectional messages or bidirectional messages.

Figure 6:
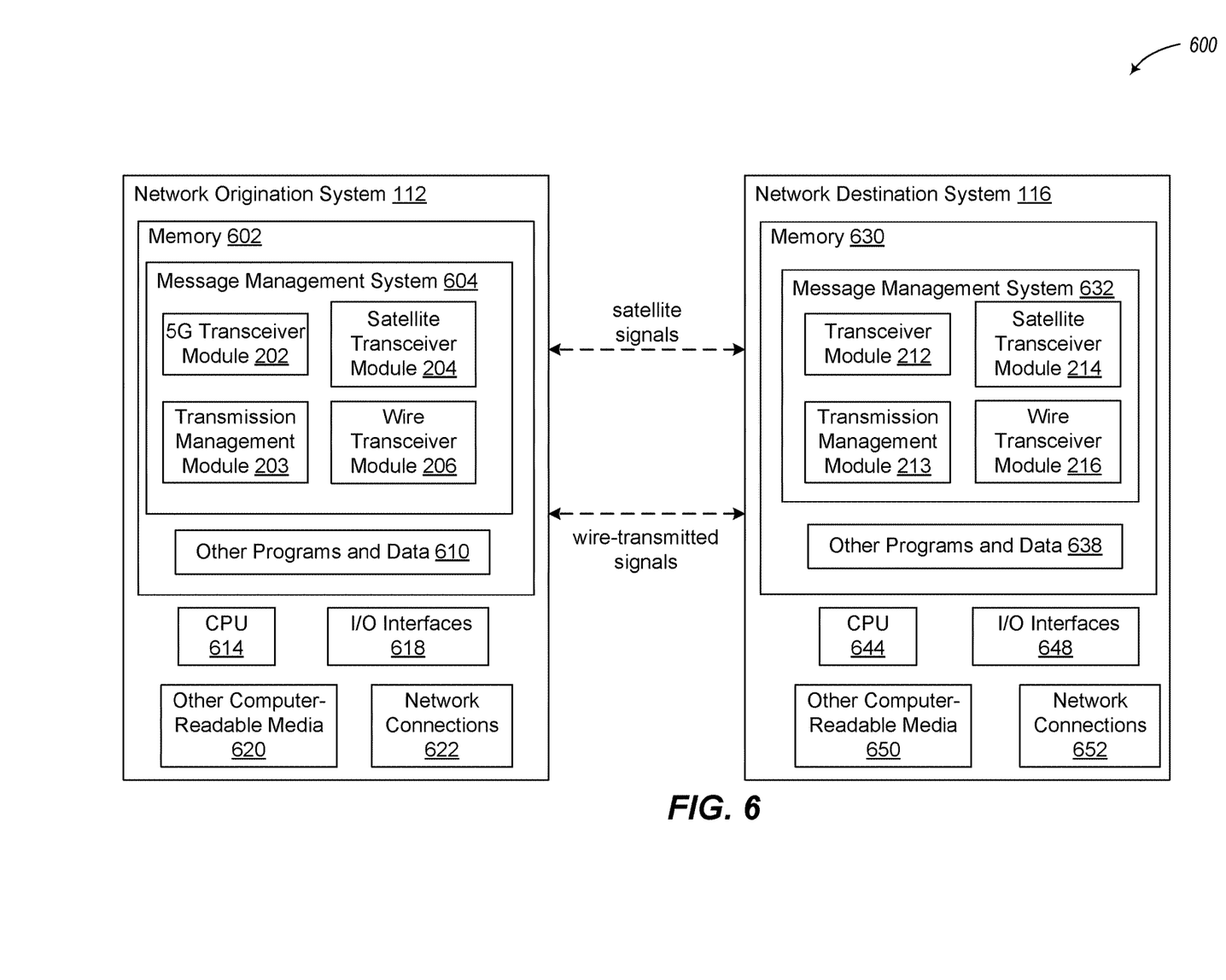
FIG. 6 shows a system diagram that describe various implementations of computing systems for implementing embodiments described herein.

FIG. 6 shows a system diagram that describes one implementation of computing systems for implementing embodiments described herein. System 600 includes a network origination system 112 and a network destination system 116.

Network origination system 112 transmits messages to network destination system 116 via wire-transmitted signals, satellite signals, or in parallel via wire-transmitted signals and satellite signals. One or more special-purpose computing systems may be used to implement network origination system 112. Accordingly, various embodiments described herein may be implemented in software, hardware, firmware, or in some combination thereof. Network origination system 112 may include memory 602, one or more central processing units (CPUs) 614, I/O interfaces 618, other computer-readable media 620, and network connections 622.

Memory 602 may include one or more various types of non-volatile and/or volatile storage technologies. Examples of memory 602 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 602 may be utilized to store information, including computer-readable instructions that are utilized by CPU 614 to perform actions, including embodiments described herein.

Memory 602 may have stored thereon message management system 604, which includes 5G transceiver module 202, transmission management module 203, satellite transceiver module 204, and wire transceiver module 206. The 5G transceiver module 202 may employ embodiments described herein to facilitate communications between the network origination system 112 and a message origination device (e.g., origination device 102 in FIG. 1). The transmission management module 203 may employ embodiments described herein to select a transmission mechanism based on a priority of the message. The satellite transceiver module 204 may employ embodiments described herein to facilitate satellite transmission communications between the network origination system 112 and the network destination system 116. The wire transceiver module 206 may employ embodiments described herein to facilitate wire transmission communications between the network origination system 112 and the network destination system 116. Memory 602 may also store other programs and data 610, which may include other programs, satellite information, transmission times, etc.

Network connections 622 are configured to communicate with other computing devices to facilitate satellite or wire transmission with network destination system 116. In various embodiments, the network connections 622 include transmitters and receivers (not illustrated) to send and receive data as described herein. I/O interfaces 618 may include a keyboard, audio interfaces, video interfaces, or the like. Other computer-readable media 620 may include other types of stationary or removable computer-readable media, such as removable flash drives, external hard drives, or the like.

Network destination system 116 receives messages from network origination system 112 via wire-transmitted signals, satellite signals, or in parallel via wire-transmitted signals and satellite signals. One or more special-purpose computing systems may be used to implement network destination system 116. Accordingly, various embodiments described herein may be implemented in software, hardware, firmware, or in some combination thereof. Network destination system 116 may include memory 630, one or more central processing units (CPUs) 644, I/O interfaces 648, other computer-readable media 650, and network connections 652.

Memory 630 may include one or more various types of non-volatile and/or volatile storage technologies similar to memory 602. Memory 630 may be utilized to store information, including computer-readable instructions that are utilized by CPU 644 to perform actions, including embodiments described herein.

Memory 630 may have stored thereon message management system 632, which includes transceiver module 212, transmission management module 213, satellite transceiver module 214, and wire transceiver module 216. The transceiver module 212 may employ embodiments described herein to facilitate communications between the network destination system 116 and a message destination device (e.g., destination device 104 in FIG. 1). The transmission management module 213 may employ embodiments described herein to determine if the message is tagged for parallel transmission and determine a quality of service of the transmission mechanism of the received message. The satellite transceiver module 214 may employ embodiments described herein to facilitate satellite transmission communications between the network origination system 112 and the network destination system 116. The wire transceiver module 216 may employ embodiments described herein to facilitate wire transmission communications between the network origination system 112 and the network destination system 116. Memory 630 may also store other programs and data 638, which may include other programs, satellite information, transmission times, etc.

Network connections 652 are configured to communicate with other computing devices to facilitate satellite or wire transmission with network origination system 116. In various embodiments, the network connections 652 include transmitters and receivers (not illustrated) to send and receive data as described herein. I/O interfaces 648 may include a keyboard, audio interfaces, video interfaces, or the like. Other computer-readable media 650 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising
a network origination system that includes:
a first memory that stores first computer instructions;
a first processor that executes the first computer instructions to perform actions, the actions including:
receiving, via 5G communication, a message from a message origination device for distribution to a message destination device;
selecting a network destination system associated with the message destination device;
determining a priority of the message;
selecting a transmission mechanism in which to transmit the message to the network destination system based on the priority, the transmission mechanism being selected from one of wire transmission, satellite transmission, or parallel transmission via both wire and satellite transmission;
in response to selection of the parallel transmission, tagging the message to indicate that the message is being transmitted to the network destination system via both the wire transmission and the satellite transmission; and
transmitting the message to the network destination system via the selected transmission mechanism.

2. The system of claim 1, wherein the first processor executes the first computer instructions to perform further actions, the further actions including:
determining a first transmission time between the network origination system and the network destination system via the wire transmission;
determining a second transmission time between the network origination system and the network destination system via the satellite transmission; and
modifying the message to include the first transmission time, the second transmission time, or both the first and second transmission times based on the selected transmission mechanism.

3. The system of claim 1, further comprising:
the network destination system includes:
a memory that stores second computer instructions; and
a processor that executes the second computer instructions to perform actions, the actions including:
receiving the message from the network origination system via the wire transmission, the satellite transmission, or the parallel transmission;
obtaining at least one transmission time from the message indicating an expected time of arrival of the message via the wire transmission or the satellite transmission;
determining if the message is tagged for the parallel transmission;
in response to the message being tagged for the parallel transmission, determining if the message is received via the wire transmission and the satellite transmission within a time window associated with the at least one transmission time; and
transmitting the message to the message destination device.

4. The system of claim 3, wherein the second processor determines if the message is received from via the wire transmission and the satellite transmission within the time window by executing the second computer instructions to perform further actions, the further actions comprising:
obtaining a transmission time from the message indicating an expected time of arrival of the message via the wire transmission;
in response to first receiving the message via the satellite transmission, determining if the message is subsequently received via the wire transmission within a time window associated with the expected time of arrival; and
in response to the message not being subsequently received via the wire transmission or being received via the wire transmission outside of the time window, transmitting a re-route request to the network origination system via the satellite transmission.

5. The system of claim 3, wherein the second processor determines if the message is received from via the wire transmission and the satellite transmission within the time window by executing the second computer instructions to perform further actions, the further actions comprising:
obtaining a transmission time from the message indicating an expected time of arrival of the message via the satellite transmission;
in response to first receiving the message via the wire transmission, determining if the message is subsequently received via the satellite transmission within a time window associated with the expected time of arrival; and
in response to the message not being subsequently received via the satellite transmission or being received via the satellite transmission outside of the time window, transmitting a re-route request to the network origination system via the wire transmission.

6. The system of claim 3, wherein the second processor executes the second computer instructions to perform further actions, the further actions including:
determining a quality of service of the wire transmission based on a comparison of a first arrival time of the message via the wire transmission and a second arrival time of the message via the satellite transmission.

7. The system of claim 3, wherein the second processor executes the second computer instructions to perform further actions, the further actions including:
determining a quality of service of the satellite transmission based on a comparison of a first arrival time of the message via the wire transmission and a second arrival time of the message via the satellite transmission.

8. The system of claim 1, wherein the first processor executes the first computer instructions to perform further actions, the further actions including:
receiving, via the satellite transmission, a re-route request indicating that the message was not received by the network destination system via the wire transmission within a time window; and
setting the satellite transmission as a preferred transmission mechanism.

9. The system of claim 1, wherein the first processor executes the first computer instructions to perform further actions, the further actions including:
receiving, via the wire transmission, a re-route request indicating that the message was not received by the network destination system via the satellite transmission within a time window; and
setting the wire transmission as a preferred transmission mechanism.

10. A method, comprising
receiving, at a network origination system via 5G communication, a message from a message origination device for distribution to a message destination device;
selecting, by the network origination system, a network destination system associated with the message destination device;
determining, by the network origination system, a priority of the message;
selecting, by the network origination system, a transmission mechanism in which to transmit the message to the network destination system based on the priority, the transmission mechanism being selected from one of wire transmission, satellite transmission, or parallel transmission via both wire and satellite transmission;
in response to selection of the parallel transmission, tagging, by the network origination system, the message with a flag to indicate that the message is being transmitted to the network destination system via both the wire transmission and the satellite transmission; and
transmitting, by the network origination system, the message to the network destination system via the selected transmission mechanism.

11. The method of claim 10, further comprising:
determining, by the network origination system, a first transmission time between the network origination system and the network destination system via the wire transmission;
determining, by the network origination system, a second transmission time between the network origination system and the network destination system via the satellite transmission; and
modifying, by the network origination system, the message to include the first transmission time, the second transmission time, or both the first and second transmission times based on the selected transmission mechanism.

12. The method of claim 10, further comprising:
receiving, by the network origination system via the satellite transmission, a re-route request indicating that the message was not received by the network destination system via the wire transmission within a time window; and
setting, by the network origination system, the satellite transmission as a preferred transmission mechanism.

13. The method of claim 10, further comprising:
receiving, by the network origination system via the wire transmission, a re-route request indicating that the message was not received by the network destination system via the satellite transmission within a time window; and
setting, by the network origination system, the wire transmission as a preferred transmission mechanism.

14. A method, comprising:
receiving, at a network destination system, a message from a network origination system via one of wire transmission, satellite transmission, or parallel transmission via both wire and satellite transmission;
obtaining, by the network destination system, at least one transmission time from the message indicating an expected time of arrival of the message via the wire transmission or the satellite transmission;
determining, by the network destination system, if the message is tagged for the parallel transmission;
in response to the message being tagged for the parallel transmission, determining, by the network destination system, if the message is received from via the wire transmission and the satellite transmission within a time window associated with the at least one transmission time; and
transmitting, by the network destination system, the message to the message destination device.

15. The method of claim 14, wherein determining if the message is received from via the wire transmission and the satellite transmission within the time window includes:
obtaining, by the network destination system, a transmission time from the message indicating an expected time of arrival of the message via the wire transmission;
in response to first receiving the message via the satellite transmission, determining, by the network destination system, if the message is subsequently received via the wire transmission within a time window associated with the expected time of arrival; and
in response to the message not being subsequently received via the wire transmission or being received via the wire transmission outside of the time window, transmitting, by the network destination system, a re-route request to the network origination system via the satellite transmission.

16. The method of claim 14, wherein determining if the message is received from via the wire transmission and the satellite transmission within the time window includes:
obtaining, by the network destination system, a transmission time from the message indicating an expected time of arrival of the message via the satellite transmission;
in response to first receiving the message via the wire transmission, determining, by the network destination system, if the message is subsequently received via the satellite transmission within a time window associated with the expected time of arrival; and
in response to the message not being subsequently received via the satellite transmission or being received via the satellite transmission outside of the time window, transmitting, by the network destination system, a re-route request to the network origination system via the wire transmission.

17. The method of claim 14, further comprising:
determining, by the network destination system, a quality of service of the wire transmission based on a comparison of a first arrival time of the message via the wire transmission and a second arrival time of the message via the satellite transmission.

18. The method of claim 14, further comprising:
determining, by the network destination system, a quality of service of the satellite transmission based on a comparison of a first arrival time of the message via the wire transmission and a second arrival time of the message via the satellite transmission.

* * * * *